(12) United States Patent
Zhang et al.

(10) Patent No.: US 9,576,214 B1
(45) Date of Patent: Feb. 21, 2017

(54) ROBUST OBJECT RECOGNITION FROM MOVING PLATFORMS BY COMBINING FORM AND MOTION DETECTION WITH BIO-INSPIRED CLASSIFICATION

(71) Applicant: HRL Laboratories, LLC, Malibu, CA (US)

(72) Inventors: Lei Zhang, Torrance, CA (US); Deepak Khosla, Camarillo, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/504,248

(22) Filed: Oct. 1, 2014

Related U.S. Application Data

(63) Continuation-in-part of application No. 14/205,349, filed on Mar. 11, 2014, and a continuation-in-part of application No. 13/938,196, filed on Jul. 9, 2013, now Pat. No. 9,008,366, which is a continuation-in-part of application No. 13/748,522, filed on Jan. 23, 2013, now Pat. No. 8,885,887.

(60) Provisional application No. 61/779,179, filed on Mar. 13, 2013, provisional application No. 61/779,143, filed on Mar. 13, 2013, provisional application No. 61/589,696, filed on Jan. 23, 2012, provisional application No. 61/780,129, filed on Mar. 13, 2013, provisional application No. 61/779,989, filed on Mar.
(Continued)

(51) Int. Cl.
*G06K 9/00* (2006.01)
*G06K 9/46* (2006.01)
*G06K 9/62* (2006.01)

(52) U.S. Cl.
CPC ......... *G06K 9/4614* (2013.01); *G06K 9/00744* (2013.01); *G06K 9/6257* (2013.01); *G06K 9/6267* (2013.01)

(58) Field of Classification Search
CPC .................................................. G06K 9/4614
See application file for complete search history.

(56) References Cited

U.S. PATENT DOCUMENTS

| | | | |
|---|---|---|---|
| 7,697,725 | B2 | 4/2010 | Burns et al. |
| 8,437,558 | B1 | 5/2013 | Medasani et al. |
| 2002/0154833 | A1 | 10/2002 | Koch et al. |

(Continued)

OTHER PUBLICATIONS

Hao et al (NPL: "Moving object detection in aerial video based on spatiotemporal saliency" Chinese Society of Aeronauntics and Astronautics, Chinese Journal of Aeronautics, p. 7, Aug. 2013).*

(Continued)

*Primary Examiner* — Oneal R Mistry
(74) *Attorney, Agent, or Firm* — Tope-McKay & Associates

(57) ABSTRACT

Described is system for object recognition from moving platforms. The system receives a video captured from a moving platform as input. The video is processed with a static object detection module to detect static objects in the video, resulting in a set of static object detections. The video is also processed with a moving object detection module to detect moving objects in the video, resulting in a set of moving object detections. The set of static object detections and the set of moving object detections are fused, resulting in a set of detected objects. The set of detected objects are classified with an object classification module, resulting in a set of recognized objects that are then output.

22 Claims, 9 Drawing Sheets

Related U.S. Application Data 13, 2013, provisional application No. 61/783,453, filed on Mar. 14, 2013.

(56) References Cited

U.S. PATENT DOCUMENTS

| | | | |
|---|---|---|---|
| 2007/0127774 A1 | 6/2007 | Zhang et al. | |
| 2007/0183669 A1 | 8/2007 | Owechko et al. | |
| 2007/0286526 A1 | 12/2007 | Abousleman | |
| 2008/0166015 A1 | 7/2008 | Haering et al. | |
| 2009/0063675 A1 | 3/2009 | Faris et al. | |
| 2010/0091330 A1 | 4/2010 | Marchesoti et al. | |
| 2010/0104199 A1* | 4/2010 | Zhang | G06K 9/00798 382/199 |
| 2010/0208941 A1* | 8/2010 | Broaddus | G01S 3/7864 382/103 |
| 2011/0142283 A1 | 6/2011 | Huang et al. | |
| 2012/0140061 A1* | 6/2012 | Zeng | G01S 13/726 348/135 |
| 2012/0189161 A1 | 7/2012 | Chang et al. | |
| 2013/0342681 A1 | 12/2013 | Duong | |
| 2015/0125032 A1* | 5/2015 | Yamanaka | H04N 5/232 382/103 |

OTHER PUBLICATIONS

Land M F; Fernald, R.D. "The Evolution of Eyes", Annual Review of Neuroscience 15: pp. 1-29 (1992).

Cucchiara, C. Grana, M. Piccardi, and A. Prati, "Detecting moving objects, ghosts and shadows in video streams", IEEE Trans. on Patt. Anal. and Machine Intell., vol. 25, No. 10, Oct. 2003, pp, 1337-1342.

D. Koller, J. Weber, T Huang, J. Malik, G. Ogasawara, B. Rao, and S. Russel, "Towards Robust Automatic Traffic Scene Anaiysis in Real-Time," in Proceedings of Int'l Conference on Pattern Recognition, 1994, pp. 126-131, Receipt date: Mar. 25, 2015.

Sudipta N. Sinha, Jan-Michael Frahm, Marc Pollefeys, and Yakup Genc, "GPU-Based Video Feature Tracking and Matching", EDGE 2006, workshop on Edge Computing Using New Commodity Architectures, Chapet Hill, May 2006.

Lowe, David G. (1999), "Object recognition from local scale-invariant features". Proceedings of the International Conference on Computer Vision 2, pp. 1150-1157.

Herbert Bay, Andreas Ess, Tinne Tuytelaars, Luc Van Gool, "SURF: Speeded Up Robust Features", Computer Vision and Image Understanding (CVIU), vol. 110, No. 3. pp. 346-359, 2008.

Martin A. Fischter and Robert C. Bolles (Jun. 1981). "Random Sample Consensus, A Paradigm for Model Fitting with Applications to Image Analysis and Automated Cartography". Comm of the ACM 24 (6): 381-395.

R. Szeliski in "Image alignment and stitching: A tutorial", Tech Report MSR-TR-2004-92, Microsoft Research, Dec. 2004. Also in Foundations and Trends in Computer Graphics and Vision, vol. 2, No. 1, (2006), pp. 1-104.

Subhabrata Bhattacharya, Haroon Idrees, lmran Saleemi, Saad Ali, and Mubarak Shah, "Moving Object Detection and Tracking in Infra-red Aerial Imagery", Machine Vision Beyond Visible Specturm, Augmented Vision and Reality, vol. 1, 2011 Springer series, DOI: 10.1007/978-3-642-115698-4.

Ondfej Chum, Jil Matas, Josef Kittler, "Locally Optimized RANSAC", Pattern Recognition (2003), pp. 236-243.

Z.Yin and R.Collins, "Moving Object Localization in Thermal Imagery by Forward-backward Motion History Images," CVPR Workshop on Object Tracking and Classification in and Beyond the Visible Spectrum (OTCBVS), New York City. NY, Jun. 2006. Also in Augmented Vision Perception in Infrared, by Riad I. Hammoud (Ed.), Springer-Verlag, Adv. Pattern Recognition Series, 2009, Chapter 12. pp. 271-291 ISBN: 978-1-S4800-276-0.

Saad Ali and Mubarak Shah, COCOA—Tracking in Aerial Imagery, SPIE Airborne Intelligence, Surveillance, Reconnaissance (ISR) Systems and Applications, Orlando, 2006.

Jiangjian Xiao. Hui Cheng, Feng Han. Harpreet S. Sawhney: Geo-spatial aerial video processing for scene understanding and object tracking. CVPR 2008.

Anubhav Agarwal, C. V Jawahar, P. J. Narayanan, "A Survey of Planar Homography Estimation Techniques", Technical Reports, International Institute of Information Technotogy. 2005, Receipt date: Mar. 25, 2015.

Laurent Itti, Christof Koch, and Ernst Niebur. "A Model of Saliency-Based Visual Attention for Rapid Scene Analysis," IEEE Transactions on Pattern Analysis and Machine Intelligencve, vol. 20, No. 11, Nov. 1998, pp. 1254-1259.

Serre, T. and Poggio, T. , "A Neuromorphic Approach to Computer Vision", Communications of the ACM (online), vol. 53, No. 10, Oct. 2010.

Mutch. J. and Lowe. D., "Multiclass Object Recognition with Sparse, Localized Features," Proc. of IEEE Conf. on Computer Vision and Pattern Recognition, Jun. 17-22, 2006, pp. 11-18.

David G. Lowe, "Object recognition from local scale-invariant features," International Conference on Computer Vision, Corfu, Greece (Sep. 1999), pp. 1150-1157.

Richard Hartley and Andrew Zisserrman "Muitipie View Geometry in Computer Vision", Second Edition, , Cambridge University Press. Mar. 2004, Section 4.7.1, pp. 117-121.

Vladimir N. Vapnik and Corinna Cortes in "Support-Vector Networks", Machine Learning, 20, 1995.

Gonzalez, Woods and Eddins, "Geometric transformations and image registration," Digital image Processing Using Matlab, 2nd Ed., Chapter 6, 2009. pp. 278-317.

Hou, Xiaodi, and Liging Zhang. "Saliency detection: A spectral residual approach." In Computer Vision and Pattern Recognition, 2007 in CVPR'07, IEEE Conference on, pp, 1-8, IEEE, 2007.

Fischier, M.A. and Bolles, R.C. in "Random Sample Consensus: A Paradigm for Model Fitting with Applications to image Analysis and Automated Cartography," Comm of the ACM, 24: 381-395, 1981.

Lin et al. in "Map-Enhanced UAV Image Sequence Registration" in WACV, lEEE Computer Society, IEEE Workshop on Applications of Computer Vision (WACV'07), pp. 15-21, 2007.

Kyungnam Kim, Yang Chan, Alexander Honda, Changsoo Jeong, Shinko Cheng, Lei Zhang, Deepak Khosla . "Bio-inspired Algorithms for Target Detection and Classification in Airborne Videos", in Proceedings of AUVSI's Unmanned Systems North America 2012 (AUVSI 2012).

Aniruddha Kembhavi, David Harwood. and Larry S. Davis. Vehicle Detection Using Partial Least Squares IEEE Trans. Pattern Anal. Mach. Intell. vol. 33, No. 6 (Jun. 2011), 1250-1265.

Paul A. Viola, Michael J. Jones: Robust Real-Time Face Detection. In ICCV 2001: 747.

Yoav Freund and Robert E. Schapire. A decision-theoretic generalization of on-line learning and an application to boosting, In Computational Leaming Theory: Eurocolt '95, pp. 23-37. Springer-Verlag, 1995.

Y. LeCun, K. Kavukcuoglu and C. Farabet, "Convolutionai Networks and Applications in Vision", in International Symposium on Circuits and Systems (ISCAS'10), IEEE, Paris, 2010.

C. Farabet, B. Martini, B. Corda, P. Akseirod, E. Culurciello and Y. LeCun. "NeuFlow: A Runtime Reconfigurable Dataflow Processor for Vision", in Proc of the Fifth IEEE Workshop on Embedded Computer Vision (ECV'11 @CVPR'11), IEEE, Colorado Springs, 2011 Invited Paper.

P. F. Felzenszwalb R. B Girshick D. McAllester, and D. Ramanan. Object detection with discriminatively trained part-based models. IEEE Transactions on Pattern Analysis and Machine Intelligence, 32(9):1627-1645, 2009.

Office Action 1 for U.S. Appl. No. 14/205,349 Date mailed: Jul. 24, 2015.

Office Action 1 Response or U.S. Appl. No. 14/205,349 Date mailed. Oct. 15, 2015.

Notice of allowance for U.S. Appl. No. 14/205,349 Date mailed: Dec. 18, 2015.

Hou, Xiaodi, and Liqing Zhang. "Saliency detection: A spectral residual approach." In Computer Vision and Pattern Recognition: 2007. CVPR'07 IEEE Conference on, pp. 1-8. IEEE, 2007.

(56) References Cited

OTHER PUBLICATIONS

Cretu, Ana-Maria, and Pierre Payeur. "Building detection in aerial images based on watershed and visual attention feature descriptors," In Computer and Robot Vision (CRV), 2013 International Conference on, pp. 265-272. IEEE, 2013.
Notice of Allowance for U.S. Appl. No. 13/938,196 Date mailed: Nov. 26, 2014.
Notice of Allowance for U.S. Appl. No. 13/748,522 Date mailed: Jul. 8, 2014.

\* cited by examiner

| Testing sequence | RS | Haar-AdaBoost | PLS |
|---|---|---|---|
| #014 | -0.770588 | -0.286275 | -0.882353 |
| #015 | -1.15655 | -0.325879 | -1.632588 |
| #016 | -1.27881 | -0.427509 | -1.27881 |
| #017 | -1.513514 | -0.389961 | -1.540541 |
| #021 | -0.332737 | -0.237925 | -0.107335 |
| #022 | -0.451697 | -0.394256 | -0.266319 |
| #030 | -0.184397 | -0.101655 | -0.229314 |
| #031 | -0.100543 | -0.119565 | -0.557065 |
| Average | -0.812613286 | -0.309065714 | -0.84818 |

FIG. 6

ROBUST OBJECT RECOGNITION FROM MOVING PLATFORMS BY COMBINING FORM AND MOTION DETECTION WITH BIO-INSPIRED CLASSIFICATION

CROSS-REFERENCE TO RELATED APPLICATIONS

This is a Continuation-in-Part application of U.S. Non-Provisional application Ser. No. 14/205,349, filed in the United States on Mar. 11, 2014, entitled, "Robust Static and Moving Object Detection System Via Attentional Mechanisms," which is a Non-Provisional patent application of U.S. Provisional Application No. 61/779,179, filed in the United States on Mar. 13, 2013, entitled, "Robust Static and Moving Object Detection System via Multi-Scale Attentional Mechanisms." U.S. Non-Provisional application Ser. No. 14/205,349 is also a Non-Provisional patent application of U.S. Provisional Application No. 61/779,143, filed in the United States on Mar. 13, 2013, entitled, "Selective Color Preprocessing for Vision Systems that Enables Optimal Detection and Recognition."

This is ALSO a Continuation-in-Part application of U.S. Non-Provisional application Ser. No. 13/938,196, filed in the United States on Jul. 9, 2013, entitled, "A Bio-Inspired Method of Ground Object Cueing in Airborne Motion Imagery." U.S. Non-Provisional application Ser. No. 13/938,196 is a Continuation-in-Part application of U.S. Non-Provisional application Ser. No. 13/748,522, filed in the United States on Jan. 23, 2013, entitled, "System for Object Detection and Recognition in Videos Using Stabilization," which is a Non-Provisional patent application of U.S. Provisional Application No. 61/589,696, filed in the United States on Jan. 23, 2012, entitled, "System for Object Detection and Recognition in Videos Using Stabilization."

U.S. Non-Provisional application Ser. No. 13/938,196 is ALSO a Non-Provisional patent application of U.S. Provisional Application No. 61/780,129, filed in the United States on Mar. 13, 2013, entitled, "MogM—A Bio-Inspired Method of Ground Object Cueing in Airborne Motion Imagery."

U.S. Non-Provisional application Ser. No. 13/938,196 is ALSO a Non-Provisional patent application of U.S. Provisional Application No. 61/779,989, filed in the United States on Mar. 13, 2013, entitled, "Robust Ground-Plane Homography Estimation Using Adaptive Feature Selection."

U.S. Non-Provisional application Ser. No. 13/938,196 is ALSO a Non-Provisional patent application of U.S. Provisional Application No. 61/783,453, filed in the United States on Mar. 14, 2013, entitled, "Moving Object Spotting by Forward-Backward Motion History Accumulation."

GOVERNMENT LICENSE RIGHTS

This invention was made with government support under U.S. Government Contract Number W3 IP4Q-08-C-0264 awarded by DARPA. The government has certain rights in the invention.

FIELD OF INVENTION

The present invention relates to a system for object recognition from moving platforms and, more particularly, to a system for object recognition from moving platforms by combining form and motion detection with bio-inspired classification.

BACKGROUND OF THE INVENTION

Aerial video analysis is challenging due to many factors, such as moving cameras, view point change, illumination change due to view angle change, and distorted object appearance due to oblique view. A previous system by the inventors used a residual saliency (RS) detection approach, a motion-based moving object detection approach known as MogM, and convolutional neural network (CNN) based classification for object recognition, as described in Literature Reference No. 1 (in the List of Incorporated Cited Literature References) and U.S. application Ser. Nos. 14/205,349 and 13/938,196, all of which are hereby incorporated by reference as though fully set forth herein. RS is based on a bio-inspired attention model and, generally, can detect image areas that are significantly different from their surroundings (i.e., salient areas). For example, RS can usually find high contrast areas as potential objects of interest. However, this approach does not take any advantage if one has knowledge of samples of the objects of interest (OIs).

Thus, a continuing need exists for a system that can better adapt to known object classes that can provide many samples for training and performs well on aerial videos captured with moving platforms (i.e., airplanes).

SUMMARY OF THE INVENTION

The present invention relates to a system for object recognition from moving platforms and, more particularly, to a system for object recognition from moving platforms by combining form and motion detection with bio-inspired classification. The system comprises one or more processors and a memory having instructions such that when the instructions are executed, the one or more processors perform multiple operations. The system receives a video captured from a moving platform as input, wherein the video comprises a plurality of image frames. The video is processed with a static object detection module to detect static objects in the plurality of image frames, resulting in a set of static object detections. The video is also processed with a moving object detection module to detect moving objects in the plurality of image frames, resulting in a set of moving object detections. The set of static object detections and the set of moving object detections are fused, resulting in a set of detected objects. The set of detected objects are classified with an object classification module, resulting in a set of recognized objects. Finally, the set of recognized objects is output.

In another aspect, the system extracts Haar features from the plurality of image frames, and processes the extracted Haar features sequentially with a cascade of classifiers to detect static objects in the plurality of image frames in the static object detection module.

In another aspect, each classifier in the cascade of classifiers is pre-trained using an AdaBoost learning technique.

In another aspect, the system rotates each image frame in the plurality of image frames gradually by angles between 0 degrees and 360 degrees. The system then processes each rotated image frame with the static object detection module to detect a set of static object detections in the rotated image frames. Each frame in the plurality of image frames is scaled within a predetermined range, and each scaled image frame is processed with the static object detection module to detect a set of static object detections in the scaled image frames. Finally, the set of static object detections in the rotated image frames and the set of static object detections in the scaled image frames are aggregated to avoid redundant static object detections.

In another aspect, if the static object detection module and the moving object detection module both detect an object in an area of an image frame, the system retains the moving object detection and ignores the static object detection when fusing the set of static object detections and the set of moving object detections.

In another aspect, the object classification module is a convolutional neural network (CNN) based object classification module.

In another aspect, the system comprises a moving platform, at least one video camera connected with the moving platform, and one or more processors and a non-transitory computer-readable medium having executable instructions encoded thereon such that when executed, the one or more processors perform multiple operations. The system receives a video captured from the video camera, wherein the video comprises a plurality of image frames. The video is processed with a static object detection module to detect static objects in the plurality of image frames, resulting in a set of static object detections. The video is processed with a moving object detection module to detect moving objects in the plurality of image frames, resulting in a set of moving object detections. The set of static object detections and the set of moving object detections are fused, resulting in a set of detected objects. The set of detected objects is then classified with an object classification module, resulting in a set of recognized objects. Finally, the set of recognized objects is output.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 6 is a table of performance scores of object detection and recognition using residual saliency (RS), Haar-AdaBoost, and partial least squares (PLS) approaches for frame-based static object detection according to the principles of the present invention;

DETAILED DESCRIPTION

Figure 1:
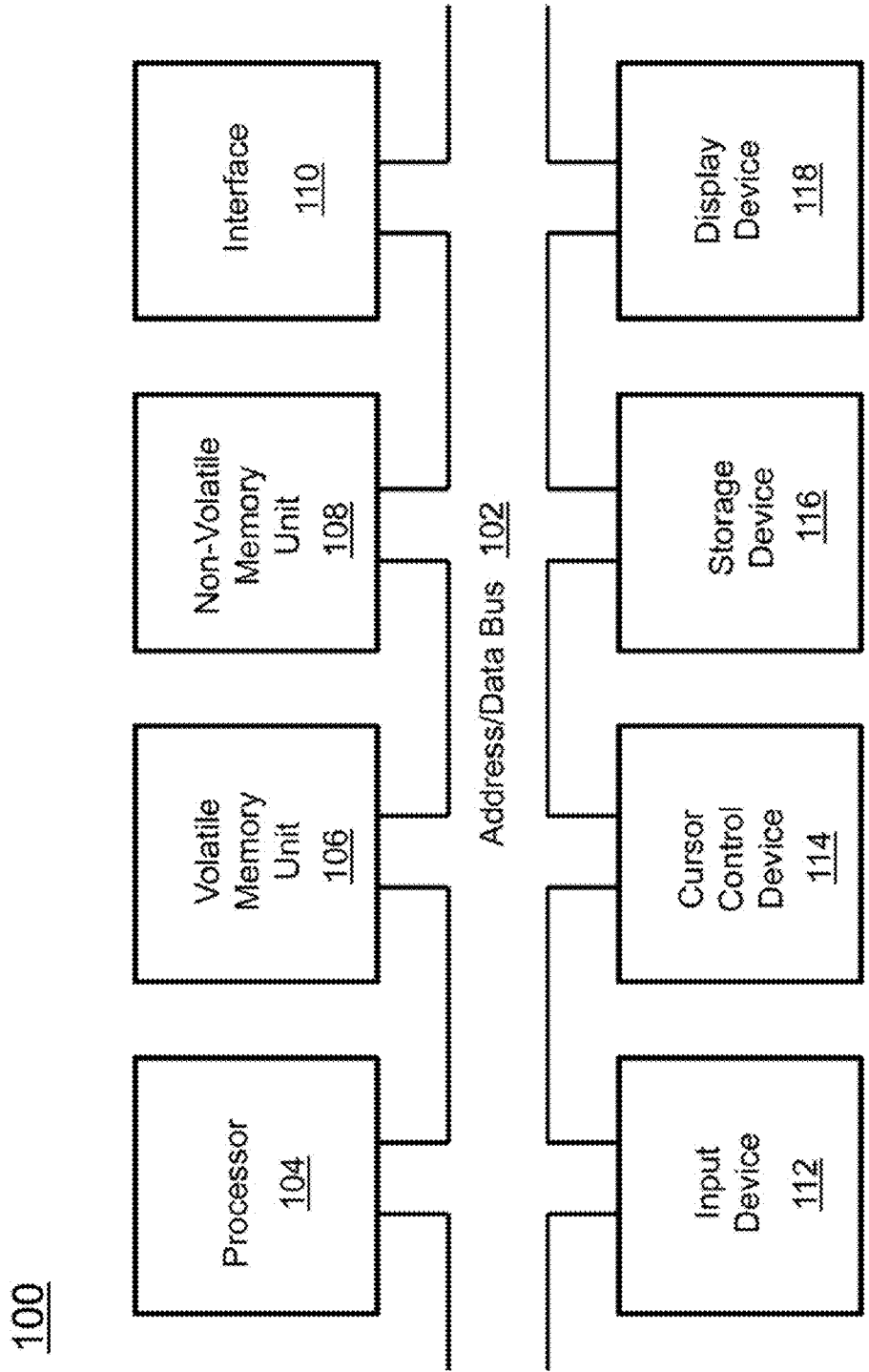
FIG. 1 is a block diagram depicting the components of a robust object recognition system according to the principles of the present invention.

The present invention relates to a system for object recognition from moving platforms and, more particularly, to a system for object recognition from moving platforms by combining form and motion detection with bio-inspired classification. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided.

Next, a description of various principal aspects of the present invention is provided. Thereafter, an introduction is provided. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Kyungnam Kim, Yang Chen, Alexander Honda, Changsoo Jeong, Shinko Cheng, Lei Zhang, Deepak Khosla. "Bio-inspired Algorithms for Target Detection and Classification in Airborne Videos", in Proceedings of AUVSI's Unmanned Systems North America 2012 (AUVSI 2012).
2. Aniruddha Kembhavi, David Harwood, and Larry S. Davis. Vehicle Detection Using Partial Least Squares. IEEE Trans. Pattern Anal. Mach. Intell. Vol. 33, No. 6 (June 2011), 1250-1265.
3. Paul A. Viola, Michael J. Jones: Robust Real-Time Face Detection. In ICCV 2001: 747.
4. Yoav Freund and Robert E. Schapire. A decision-theoretic generalization of on-line learning and an application to boosting. In Computational Learning Theory: Eurocolt '95, pages 23-37. Springer-Verlag, 1995.
5. Y. LeCun, K. Kavukcuoglu and C. Farabet, "Convolutional Networks and Applications in Vision", in International Symposium on Circuits and Systems (ISCAS '10), IEEE, Paris, 2010.
6. C. Farabet, B. Martini, B. Corda, P. Akselrod, E. Culurciello and Y. LeCun, "NeuFlow: A Runtime Reconfigurable Dataflow Processor for Vision", in Proc. of the Fifth IEEE Workshop on Embedded Computer Vision (ECV '11 @ CVPR '11), IEEE, Colorado Springs, 2011. Invited Paper.
7. P. F. Felzenszwalb, R. B. Girshick, D. McAllester, and D. Ramanan. Object detection with discriminatively trained part-based models. IEEE Transactions on Pattern Analysis and Machine Intelligence, 32(9): 1627-1645, 2009.

(2) PRINCIPAL ASPECTS

The present invention has three "principal" aspects. The first is a system for object recognition from moving platforms. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
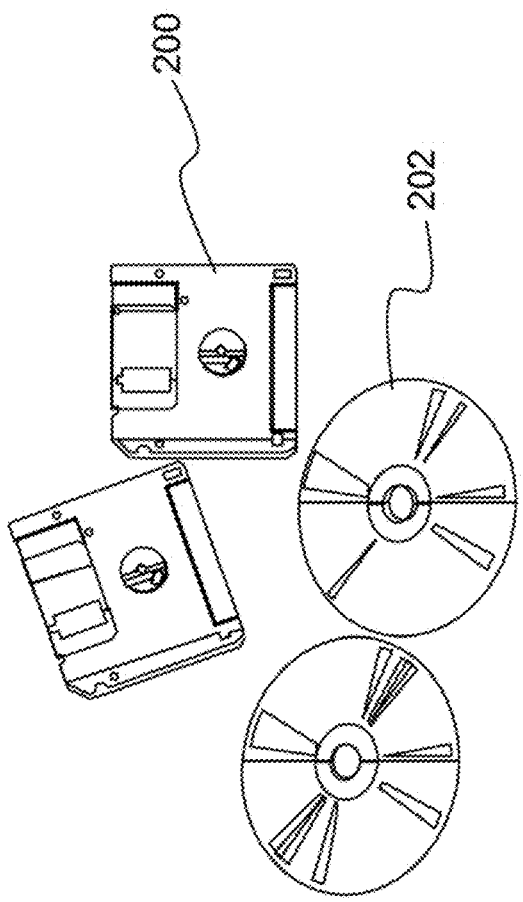
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Aerial video analysis is challenging due to many factors, such as moving cameras, view point change, illumination change due to view angle change, and distorted object appearance due to oblique view. The system according to the principles of the present invention utilizes Haar features and an AdaBoost learning technique (see Literature Reference No. 3) (Haar-AdaBoost) for frame-based object detection. The Haar-AdaBoost process combined with MogM and CNN classification showed good performance in experimental studies, as will be described in detail below. The system described herein also performed better and faster than another alternative solution that used a partial least squares (PLS) approach (see Literature Reference No. 2) for frame-based object detection. As will be described in detail below, experimental results demonstrated the present invention is a good solution for dealing with aerial videos captured from moving platforms.

(4) SPECIFIC DETAILS OF THE INVENTION

(4.1) System Overview

Described is a system that uses Haar features and an AdaBoost (Haar-AdaBoost) based process for frame-based object detection (i.e., form detection), combined with motion based object detection (MogM) and convolutional neural network (CNN) based classification, for aerial video analysis from a platform. Specifically, a classifier using Haar features is pre-trained using an AdaBoost learning technique. AdaBoost is short for adaptive boosting. This classifier is used in a raster scanning manner throughout each image frame at regular spatial intervals to detect a particular type of object of interest (OI), such as vehicles. It serves as a frame-based method for detecting OIs. In addition, the MogM approach stabilizes the video and detects OIs that are moving. All OIs detected by either Haar-AdaBoost or MogM are fused and fed into a pre-trained CNN based classifier to perform object recognition. The system finally generates recognized objects and their classification probabilities as the output. Each of these aspects will be described in further detail below.

In one aspect, the platform is a moving platform. Non-limiting examples of a moving platform upon which aerial video can be captured include airplanes, helicopters, airships, and unmanned aerial vehicles (UAVs). In principle, any platform that can capture an overhead view of an area of interest could be used. Therefore, in another aspect, the platform may be non-moving, such as a high tower where overhead images could be captured.

The processor and memory can be integrated on the moving platform or separately. For example, in airplanes or UAVs, one could have the processor and memory integrated. However, if a distributed architecture is used, the sensor (i.e., camera), memory, and processor could be at different locations, which would require wireless transmission of the data.

Figure 3:
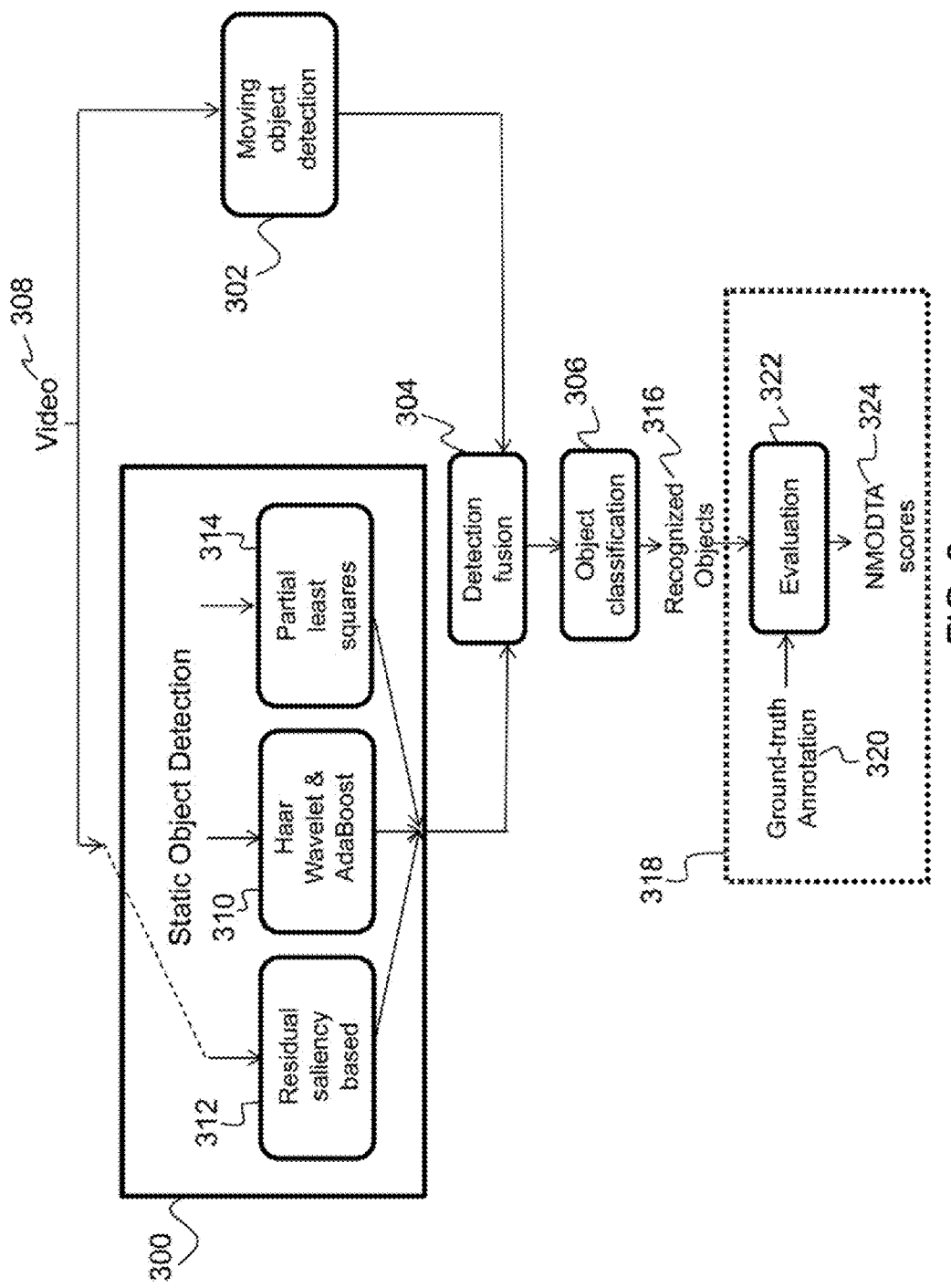
FIG. 3 is a flow diagram of an object detection and classification system and its performance evaluation process according to the principles of the present invention.

FIG. 3 shows a flow diagram of the object detection and classification system according to the principles of the present invention. The complete video analysis system comprises several major components including: a static object detection module 300, a moving object detection module 302; a static and moving object detection fusion module 304; and an object classification module 306. The present invention specifically focuses on the static object detection module 300, which receives, for example, an aerial video 308 as input. The moving object detection module 302 also receives the aerial video 308 as input. The present invention uses Haar-wavelet and AdaBoost detection (Haar-AdaBoost) 310 for the static object detection. Optionally a residual saliency (RS) based approach 312 and a state-of-the-art partial least squares (PLS) method 314 (see Literature Reference No. 2 for a description of the PLS method) that was reported to be a good fit for aerial video analysis is included.

Once static objects are detected by any one of the static object detection approaches in the static object detection module 300, the output from one of the approaches is fused with the output (i.e., moving objects) detected by the moving object detection module 302 (i.e., MogM) using the static and moving object detection fusion module 304. The static and moving object detection fusion module 304 decides how to fuse the objects when detections overlap in certain image areas. These detections are further classified by the object classification module 306 to recognize the object class for each detection, a non-limiting example of which is a pre-trained CNN based classifier. The system, therefore, generates a list of recognized objects 316 with their recognized labels, which informs the user what the recognized objects 316 are and where they can be found in the images. Finally, to monitor the performance of the system, a performance evaluation process 318 compares the recognized objects with a ground-truth annotation 320 using an evaluation tool 322 to generate normalized multiple object thresholded detection accuracy (NMODTA) scores 324 that indicate how well the system performs. A NMODTA score 324 is used as an objective performance measurement throughout experimental studies of the system according to the principles of the present invention.

(4.2) Haar Features and AdaBoost Based Static Object Detection 310

For detecting objects of interest based on a single frame, the Viola-Jones approach (described in Literature Reference No. 3) was adopted for robust object detection. This approach is a patch-based approach, which means each local image area is rescaled to a fixed size image patch for feature extraction. The extracted features are then fed through a cascade of classifiers for quick and robust classification.

Figure 4:
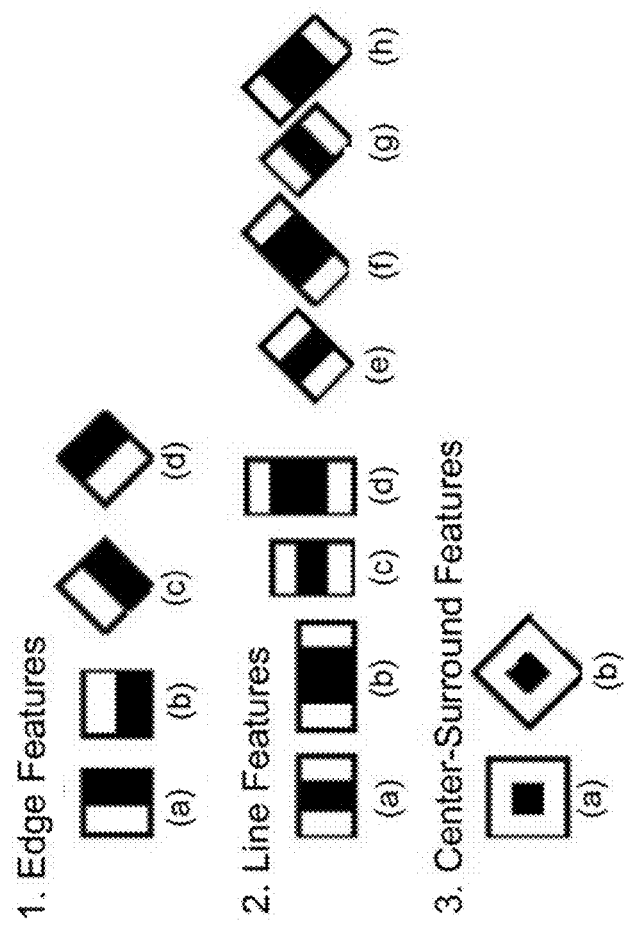
FIG. 4 illustrates examples of Haar kernels for feature extraction according to the principles of the present invention.

In a desired aspect of the present invention, Haar features are used for feature extraction. However, as can be appreciated by one skilled in the art, other features can be also be used for feature extraction. Haar features can be calculated by a simple calculation using Haar kernels, as illustrated in FIG. 4. For example, for the Haar kernel 1(a) in FIG. 4, the Haar feature is the difference between the sum of pixel values in the white half rectangle and that in the black half rectangle. For the kernel 2(c), the Haar feature is the difference between the sum of pixel values in two white rectangles and that in the black rectangle. One advantage of using Haar features for object detection is their computational efficiency. Using the technology called integral image (see Literature Reference No. 3 for a description of the integral image technology), Haar features can be very rapidly calculated and appropriate for real-time applications.

Figure 5:
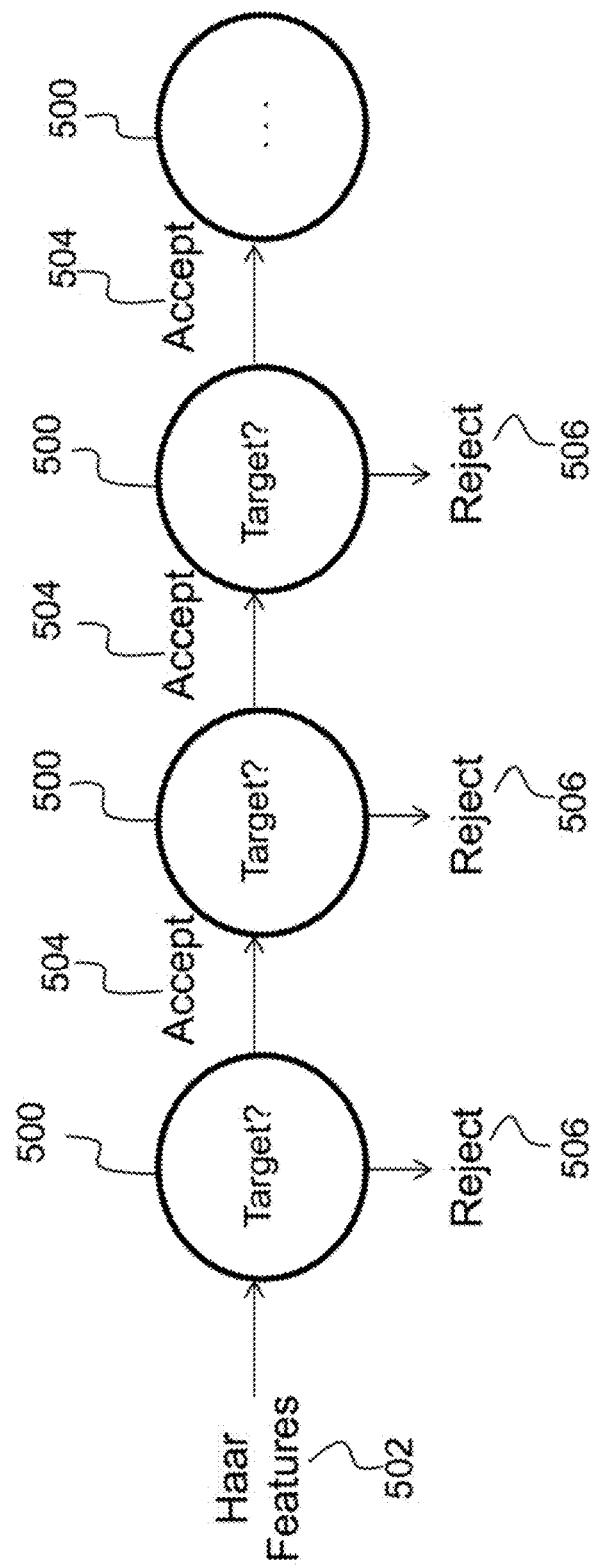
FIG. 5 illustrates a cascade of classifiers for robust object detection according to the principles of the present invention.

Once Haar features are extracted, they can be used for classification. A pre-trained classifier is needed for validating if an object of interest exists in each image patch or not. In principle, any classifier can be used for this purpose. However, it was shown that a cascade of boosted classifiers performed very well for this type of task. FIG. 5 illustrates a cascade of classifiers 500 for robust object detection (represented by element 310 in FIG. 3). The cascade approach passes the Haar features 502 through a set of classifiers 500 sequentially. Each classifier 500 accepts 504 or rejects 506 the hypothesis that the object of interest (or target) exists. By cascading, it is possible to maintain a high positive detection (PD) rate while significantly reducing the false positive (FP) rate. For example, if each classifier has a 99.9% PD and a 40% FP, an 8-level cascade of classifiers can achieve 99.2% PD and 0.066% FP.

There is no special requirement for each classifier in the cascade. In a desired aspect, an AdaBoost based classifier (element 310) was selected for each node 500 in the cascade of classifiers. The classifier is trained with a variant of a boosting technique (see Literature Reference No. 4 for a description of the boosting technique) called AdaBoost learning. In general, with boosting techniques, a set of "weak" classifiers are weightedly combined together to form a "strong" classifier whose performance is much better than any of the weak classifiers. All thresholds in the AdaBoost classifier and the features used in weak classifiers should be learned. A simple weak classifier consists of a feature and a threshold (as described in Literature Reference No. 3). Due to the choice of simple weak classifiers, the off-line learning and online calculation of AdaBoost classifiers is very fast and computationally efficient, making them very useful in practice.

Using Haar-AdaBoost detection (depicted as element 310 in FIG. 3), the system according to the principles of the present invention performs object detection by scanning image patches across an image frame at regular spatial intervals. Using smaller intervals usually yields more dense detection but costs more in computation. In practice, the scanning spatial intervals need to be empirically set so as to make a good compromise between detection and computation. In addition, there are two other factors that are taken into account. First, the objects of interest may be in a rotated pose, such as cars parked in different orientations. Therefore, the detection system has to be able to deal with rotation. For this purpose, the entire image is rotated gradually by angles spanned evenly between 0 and 360 degrees, with a 10 degree increment used in experimental studies described below. Haar-AdaBoost detection (depicted as element 310 in FIG. 3) is applied to each rotated image to find potential objects of interest. All detections will be aggregated later to form the final detection set.

Second, scaling is another factor that is considered. This is because the size of the object may change due to the change of view distances. Thus, the image is rescaled within a range (e.g., 90% to 105% in experimental studies) and Haar-AdaBoost detection (depicted as element 310 in FIG. 3) is applied at each scaled image. All detections are aggregated later, as well.

Moreover, due to processing at multiple scales and different rotations, it is highly likely that there are duplicate detections for the same object in certain image areas. An aggregation process is, therefore, necessary to avoid redundant detections. The static and moving object detection fusion module 304 in FIG. 3 includes the aggregation process. Literature Reference No. 7 describes the use of non-maximum suppression for removing redundant detections that correspond to the same object (i.e., an aggregation process). There are different ways to realize aggregation, such as by max operation and by averaging. In one aspect of the invention, the averaging technique for aggregation was chosen. First, clusters of detections are found by analyzing the distance between the centroids of different detections. Second, the detections within each cluster are averaged to find the averaged bounding boxes that indicate the spatial location of the object of interest. More specifically, the centroid of the aggregated detections is the average of all centroids within the same cluster. The same is true for the width and height of the aggregated detections. The orientation of the long axis is the average orientation of the long axes with respect to the horizontal axis (x-axis).

(4.3) Motion Based Moving Target Detection and Detection Fusion

MogM (depicted as the moving object detection module 302 in FIG. 3) performs moving target detection by change detection. Since the system according to the principles of the present invention receives aerial videos (depicted as element 308 in FIG. 3) captured with moving cameras as input, MogM has to compensate for the effect due to moving cameras. For this purpose, the first step of MogM detection is stabilizing the videos. Specifically, MogM extracts many bio-inspired salient features from each image frame and performs feature matching to find matched points between multiple (at least two) image frames within a temporal window around the current frame. With these matched points, MogM estimates the homography of the ground plane. By transforming each frame using the homography into the current frame (i.e., the reference frame), MogM can significantly reduce the effects caused by moving cameras (i.e., stabilize the videos).

Once video stabilization is finished, MogM detects the frame changes by accumulating frame differences across a temporal window. If the accumulated frame difference is above a predetermined threshold, a pixel is declared as belonging to the moving foreground. A map of foreground pixels is formed by performing frame differencing for each pixel. Finally, morphological operations and blob detection are performed on this map to detect blobs of foreground pixels that correspond to potential moving targets. For additional details regarding MogM refer to U.S. application Ser. No. 13/938,196, which is hereby incorporated by reference as though fully set forth herein.

Usually a frame-based detection approach, such as the RS approach or the Haar-AdaBoost approach, detects static salient targets, while MogM detects moving targets. One output from elements 312, 310, or 314 is fused with the output of the moving object detection module 302 in the static and moving object detection fusion module (depicted as element 304 in FIG. 3) before the object classification module (depicted as element 306 in FIG. 3). In a desired aspect, the output of the Haar-AdaBoost detection (depicted as element 310 in FIG. 3) is fused with the output of the moving object detection module 302. This combination is compared with the other two choices. For instance, the combination of the output of the residual saliency (RS) based approach 312 with the output of the moving object detection module 302 and the combination of the output of the partial least squares method 314 with the output of the moving object detection module 302 are compared with the combination of the output of the Haar-AdaBoost detection (element 310) and the output of the moving object detection module 302. In experimental studies, the combination of the output of the Haar-AdaBoost detection (element 310) and the output of the moving object detection module 302 performed the best.

Since the moving objects could also be salient objects in a frame, the frame-based approach may sometimes detect the moving objects as well. This will cause duplicate detection of the same object, or inconsistent detection by different processes. Embodiments according to the principles of the present invention may favor the detection by one approach over the others, or one can aggregate multiple detections within the same image area. In a desired aspect of the present invention, MogM detection results are favored since MogM leverages multiple frames to detect moving objects, which turns out to be more robust. For instance, if both MogM (depicted as the moving object detection module 302 in FIG. 3) and Haar-AdaBoost (element 310) detect a target in the same image area, the MogM detection is retained while the other is ignored. The fused detection sets (fused in the static and moving object detection fusion module (depicted as element 304 in FIG. 3) are then fed into the object classification module 306 for object recognition.

(4.4) CNN-Based Object Classification

In a desired aspect, a convolutional neural network (CNN)-based classifier is used for object classification (element 306) in the system according to the principles of the present invention. A CNN-based classifier is a powerful neural network designed for digits and image classification (see Literature Reference No. 5 for a description of CNNs). It is quite appropriate for hardware implementation and was shown to perform very well on benchmarked digits recognition and image categorization tasks.

A typical CNN-based classifier consists of several layers. The first layer performs features extraction on the input image by convolving the image portion with a convolutional kernel. The convolution response is then subsampled by max-pooling or average-pooling within a local neighborhood. The max (or average) responses of the convolution responses form the input "feature map" for the next layer. In the subsampled map, the above convolution process, max/average operation, and subsampling are performed again to generate the input for deeper layers. This process can be repeated several times until each subsample becomes a single point. In the end it forms a vector of float numbers (i.e., features) that can be used for classification. Given a large set of training samples, the above process can be applied to each sample to generate a feature vector sample. Supervised learning is then used to train a neural network classifier, usually based on gradient descent or stochastic gradient descent (see Literature Reference No. 5).

In its design, a CNN-based classifier mimics the functions of primates' visual cortex system. Due to its bio-inspired hierarchical structure and non-linear components, a CNN model can capture highly non-linear relations in real-life visual data, and results in compact models that are conducive for efficient computing. In fact, the CNN model has been implemented, as described in Literature Reference No. 6, for real-time operation. In experimental studies of the present invention, CNNs were used in computer clusters for computational efficiency.

(4.5) Experimental Results

The Haar-AdaBoost detection (depicted as element 310 in FIG. 3) was implemented using OpenCV library, and the system according to the principles of the present invention was tested on eight videos from the TAILWIND dataset that was used in a DARPA summative test. The TAILWIND dataset is a dataset that was captured in airplanes with significant motion and at low to middle altitudes. The cameras were pointed at the ground in an oblique view, making the shapes of objects distorted. Most objects of interest in the videos are static cars or moving cars. Due to this observation, vehicle detection by partial least squares (PLS) (see Literature Reference No. 2) was used for comparison. Specifically, PLS detection (depicted as element 314) was used as the third approach for frame-based object detection, as illustrated in FIG. 3. The output of the PLS detection (element 314) was converted to a format accepted by the system so that the PLS detection (element 314) could also be fused with MogM detections from the moving object detection module 302. All detections were used for CNN classification in the object classification module (element 306).

Figure 7A:
FIG. 7A illustrates an example result of RS detection on an image frame according to the principles of the present invention.
Figure 7B:
FIG. 7B illustrates an example result of PLS detection on an image frame according to the principles of the present invention.
Figure 7C:
FIG. 7C illustrates an example result of Haar-AdaBoost detection on an image frame according to the principles of the present invention.

Each test video had 100 image frames, and each image frame size was 3660×2748 pixels. Due to its large image size and considerable required computation (especially by the PLS approach), object detection was performed on every five image frames. FIGS. 7A-7C show example results by each method for the same image frame. FIG. 7A represents RS detections, FIG. 7B represents PLS detections, and FIG. 7C represents Haar-AdaBoost detections. In each figure, the red boxes 702 represent the objects detected by each approach. In FIG. 7A, the large green boxes 704 indicate areas that were not considered for quantitative performance evaluation by the DARPA software. The small green boxes 706 indicate areas that are considered for quantitative performance evaluation by the DARPA software. In other words, the small green boxes 706 represent ground truth vehicles that should be detected by the evaluated processes (e.g., RS approach, PLS approach, Haar-AdaBoost approach). In FIGS. 7A and 7B, one can see that both the RS and the PLS approaches, respectively, had some difficulty in detecting dark/grey colored cars, while the Haar-AdaBoost approach (FIG. 7C) was able to detect these cars better. Haar-AdaBoost also detected more cars in cluttered scenarios (i.e., in parking lots).

To quantitatively evaluate the performance, all recognition results after the CNN classification stage were converted to a format accepted by the DARPA official evaluation software. Then, the performance evaluation process (depicted as element 318 in FIG. 3) was run. The DARPA software compares the recognized objects (depicted as element 316 in FIG. 3) with the ground-truth annotations (depicted as element 320 in FIG. 3) to calculate performance metric called the NMODTA (normalized multiple object thresholded detection accuracy) score (depicted as element 324 in FIG. 3). NMODTA was defined as below and used to score the performance of each approach as follows:

$$NMODTA = 1 - \frac{\sum_{t=1}^{N_{frames}} (c_m(md^{(t)}) + c_f(fp^{(t)}))}{\sum_{t=1}^{N_{frames}} N_G^{(t)}},$$

where md represents the number of miss detection, fp represents the number of false positives, $N_G$ represents the number of ground-truths. In the evaluation, the cost functions $c_m$ and $c_f$ are set equal (i.e., $c_m=1$ and $c_f=1$). The object recognition probability score from CNN classification in the object classification module (element 306 in FIG. 3) is thresholded by a threshold set as the input parameter when running the DARPA software. Generally speaking, a higher NMODTA score means better performance.

Performance evaluation was assessed for eight TAILWIND sequences with a 0.2 threshold. The quantitative evaluation results are summarized in the table in FIG. 6. The table lists the eight testing sequences along with each NMODTA score for the different approaches, along with an average NMODTA score for each approach. Although all three approaches (RS, Haar-AdaBoost, PLS) generated negative NMODTA scores in the evaluation, the Haar-AdaBoost achieved an overall better performance than both the RS and PLS approaches. The average NMODTA score by Haar-AdaBoost across eight sequences was significantly higher than the other two approaches, while RS and PLS achieved similar average NMODTA scores.

What is claimed is:

1. A system for object recognition from moving platforms, the system comprising:
   one or more processors and a non-transitory computer-readable medium having executable instructions encoded thereon such that when executed, the one or more processors perform operations of:
   receiving a video captured from a moving platform as input, wherein the video comprises a plurality of image frames;
   processing each image frame in the plurality of image frames with a static object detection module to detect at least one of a first type of object, having static object characteristics, in the image frame, resulting in at least one static object detection, wherein the at least one first type of object is stationary relative to a around surface in the image frame;
   following processing of the image frame with the static object detection module, processing the image frame with a moving object detection module to detect at least one of a second type of object, having moving object characteristics, in the image frame, resulting in at least one moving object detection;
   fusing the at least one static object detection and the at least one moving object detection, resulting in a set of detected objects, wherein an aggregation process removes redundant detections that correspond to the same object;
   classifying the set of detected objects with an object classification module, resulting in a set of recognized objects; and
   outputting the set of recognized objects.

2. The system as set forth in claim 1, wherein the one or more processors further perform operations of:
   extracting Haar features from the plurality of image frames; and
   processing the extracted Haar features sequentially with a cascade of classifiers to detect static objects in the plurality of image frames in the static object detection module.

3. The system as set forth in claim 2, wherein each classifier in the cascade of classifiers is pre-trained using an AdaBoost learning technique.

4. The system as set forth in claim 1, wherein the one or more processors further perform operations of:
   rotating each image frame in the plurality of image frames gradually by angles between 0 degrees and 360 degrees; and
   processing each rotated image frame with the static object detection module to detect a set of static object detections in the rotated image frames.

5. A system for object recognition from moving platforms, the system comprising:
   one or more processors and a non-transitory computer-readable medium having executable instructions encoded thereon such that when executed, the one or more processors perform operations of;
   receiving a video captured from a moving platform as input, wherein the video comprises a plurality of image frames;

processing the video with a static object detection module to detect static objects in the plurality of image frames, resulting in a set of static object detections;

processing the video with a moving object detection module to detect moving objects in the plurality of image frames, resulting in a set of moving object detections;

fusing the set of static object detections and the set of moving object detections, resulting in a set of detected objects;

classifying the set of detected objects with an object classification module, resulting in a set of recognized objects; and outputting the set of recognized objects, wherein the one or more processors further perform operations of:

rotating each image frame in the plurality of image frames gradually by angles between 0 degrees and 360 degrees;

processing each rotated image frame with the static object detection module to detect a set of static object detections in the rotated image frames;

scaling each image frame in the plurality of image frames within a predetermined range;

processing each scaled image frame with the static object detection module to detect a set of static object detections in the scaled image frames; and aggregating the set of static object detections in the rotated image frames and the set of static object detections in the scaled image frames to avoid redundant static object detections.

6. The system as set forth in claim 5, wherein if the static object detection module and the moving object detection module both detect an object detection in an area of an image frame, the one or more processors further perform an operation of retaining the moving object detection and ignoring the static object detection when fusing the set of static object detections and the set of moving object detections.

7. The system as set forth in claim 6, wherein the object classification module is a convolutional neural network (CNN) based object classification module.

8. A computer-implemented method for object recognition from moving platforms, comprising:

an act of causing a data processor to execute instructions stored on a non-transitory memory such that upon execution, the data processor performs operations of:

receiving a video captured from a moving platform as input, wherein the video comprises a plurality of image frames;

processing each image frame in the plurality of image frames with a static object detection module to detect at least one of a first type of object, having static object characteristics in the image frame, resulting in at least one static object detection, wherein the at least one first type of object is stationary relative to a ground surface in the image frame;

following processing of the image frame with the static object detection module, processing the image frame with a moving object detection module to detect at least one of a second type of object, having moving object characteristics, in the image frame, resulting in at least one moving object detection;

fusing the at least one static object detection and the at least one moving object detection, resulting in a set of detected objects, wherein an aggregation process removes redundant detections that correspond to the same object;

classifying the set of detected objects with an object classification module, resulting in a set of recognized objects; and outputting the set of recognized objects.

9. The method as set forth in claim 8, wherein the one or more processors further perform operations of:

extracting Haar features from the plurality of image frames; and processing the extracted Haar features sequentially with a cascade of classifiers sequentially to detect static objects in the plurality of image frames in the static object detection module.

10. The method as set forth in claim 9, wherein each classifier in the cascade of classifiers is pre-trained using an AdaBoost learning technique.

11. A computer-implemented method for object recognition from moving platforms, comprising:

an act of causing a data processor to execute instructions stored on a non-transitory memory such that upon execution, the data processor performs operations of:

receiving a video captured from a moving platform as input, wherein the video comprises a plurality of image frames;

processing the video with a static object detection module to detect static objects in the plurality of image frames, resulting in a set of static object detections;

processing the video with a moving object detection module to detect moving objects in the plurality of image frames, resulting in a set of moving object detections;

fusing the set of static object detections and the set of moving object detections, resulting in a set of detected objects;

classifying the set of detected objects with an object classification module, resulting in a set of recognized objects; and outputting the set of recognized objects, wherein the one or more processors further perform operations of:

rotating each image frame in the plurality of image frames gradually by angles spanned evenly between 0 degrees and 360 degrees;

processing each rotated image frame with the static object detection module to detect a set of static object detections in the rotated image frames;

scaling each image frame in the plurality of image frames within a predetermined range;

processing each scaled image frame with the static object detection module to detect a set of static object detections in the scaled image frames; and aggregating the set of static object detections in the rotated image frames and the set of static object detections in the scaled image frames to avoid redundant static object detections.

12. The method as set forth in claim 11, wherein if the static object detection module and the moving object detection module both detect an object detection in an area of an image frame, the one or more processors further perform an operation of retaining the moving object detection and ignoring the static object detection when fusing the set of static object detections and the set of moving object detections.

13. The method as set forth in claim 12, wherein the object classification module is a convolutional neural network (CNN) based object classification module.

14. A computer program product for object recognition from moving platforms, the computer program product comprising computer-readable instructions stored on a non-transitory computer-readable medium that are executable by a computer having a processor for causing the processor to perform operations of:

receiving a video captured from a moving platform as input, wherein the video comprises a plurality of image frames;

processing each image frame in the plurality of image frames with a static object detection module to detect at least one of a first type of object, having static object characteristics, in the image frames, resulting in at least one static object detection, wherein the at least one first type of object is stationary relative to a ground surface in the image frame;

following processing of the image frame with the static object detection module, processing the image frame with a moving object detection module to detect at least one of a second type of object, having moving object characteristics, in the image frame, resulting in at least one moving object detection;

fusing the at least one static object detection and the at least one moving object detection, resulting in a set of detected objects, wherein an aggregation process removes redundant detections that correspond to the same object;

classifying the set of detected objects with an object classification module, resulting in a set of recognized objects; and outputting the set of recognized objects.

15. The computer program product as set forth in claim 14, further comprising instructions for causing the processor to perform operations of:

extracting Haar features from the plurality of image frames; and processing the extracted Haar features sequentially with a cascade of classifiers sequentially to detect static objects in the plurality of image frames in the static object detection module.

16. The computer program product as set forth in claim 15, wherein each classifier in the cascade of classifiers is pre-trained using an AdaBoost learning technique.

17. A computer program product for object recognition from moving platforms, the computer program product comprising computer-readable instructions stored on a non-transitory computer-readable medium that are executable by a computer having a processor for causing the processor to perform operations of:

receiving a video captured from a moving platform as input, wherein the video comprises a plurality of image frames;

processing the video with a static object detection module to detect static objects in the plurality of image frames, resulting in a set of static object detections;

processing the video with a moving object detection module to detect moving objects in the plurality of image frames, resulting in a set of moving object detections;

fusing the set of static object detections and the set of moving object detections, resulting in a set of detected objects;

classifying the set of detected objects with an object classification module, resulting in a set of recognized objects; and outputting the set of recognized objects, wherein the computer program product further comprises instructions for causing the processor to perform operations of:

rotating each image frame in the plurality of image frames gradually by angles spanned evenly between 0 degrees and 360 degrees;

processing each rotated image frame with the static object detection module to detect a set of static object detections in the rotated image frames;

scaling each image frame in the plurality of image frames within a predetermined range;

processing each scaled image frame with the static object detection module to detect a set of static object detections in the scaled image frames; and aggregating the set of static object detections in the rotated image frames and the set of static object detections in the scaled image frames to avoid redundant static object detections.

18. The computer program product as set forth in claim 17, wherein if the static object detection module and the moving object detection module both detect an object detection in an area of an image frame, the computer program product further comprises instructions for causing the processor to perform an operation of retaining the moving object detection and ignoring the static object detection when fusing the set of static object detections and the set of moving object detections.

19. The computer program product as set forth in claim 18, wherein the object classification module is a convolutional neural network (CNN) based object classification module.

20. A system for object recognition from moving platforms, the system comprising:

a moving platform;

at least one video camera connected with the moving platform;

one or more processors and a non-transitory computer-readable medium having executable instructions encoded thereon such that when executed, the one or more processors perform operations of:

receiving a video captured from the video camera, wherein the video comprises a plurality of image frames;

processing each image frame in the plurality of image frames with a static object detection module to detect at least one of a first type of object, having static object characteristics in the image frame, resulting in at least one static object detection, wherein the at least one first type of object is stationary relative to a around surface in the image frame;

following processing of the image frame with the static object detection module, processing the image frame with a moving object detection module to detect at least one of a second type of object, having moving object characteristics in the image frame, resulting in at least one moving object detection;

fusing the at least one static object detection and the at least one moving object detection, resulting in a set of detected objects, wherein an aggregation process removes redundant detections that correspond to the same object;

classifying the set of detected objects with an object classification module, resulting in a set of recognized objects; and outputting the set of recognized objects.

21. A system for object recognition from moving platforms, the system comprising:

one or more processors and a non-transitory computer-readable medium having executable instructions encoded thereon such that when executed, the one or more processors perform operations of;

receiving a video captured from a moving platform as input, wherein the video comprises a plurality of image frames;

processing the video with a static object detection module to detect static objects in the plurality of image frames, resulting in a set of static object detections;

processing the video with a moving object detection module to detect moving objects in the plurality of image frames, resulting in a set of moving object detections;

fusing the set of static object detections and the set of moving object detections, resulting in a set of detected objects;

classifying the set of detected objects with an object classification module, resulting in a set of recognized objects; and outputting the set of recognized objects, wherein the one or more processors further perform operations of:

rotating each image frame in the plurality of image frames gradually by angles between 0 degrees and 360 degrees;

processing each rotated image frame with the static object detection module to detect a set of static object detections in the rotated image frames;

scaling each image frame in the plurality of image frames within a predetermined range; and processing each scaled image frame with the static object detection module to detect a set of static object detections in the scaled image frames.

22. The system as set forth in claim 21, wherein the one or more processors further perform an operation of:

aggregating the set of static object detections in the rotated image frames and the set of static object detections in the scaled image frames to avoid redundant static object detections.

* * * * *